United States Patent
Cao et al.

(10) Patent No.: US 7,280,513 B2
(45) Date of Patent: Oct. 9, 2007

(54) METHOD OF TRANSMISSION OF A DATA FRAME FROM A FIRST STATION TO A SECOND STATION, AND A CDMA TELECOMMUNICATIONS NETWORK

(75) Inventors: Qiang Cao, Swindon (GB); Patrick Georges Venceslas Charriere, Tetbury (GB); Seau Sian Lim, Swindon (GB); Philip Charles Sapiano, Corsham (GB)

(73) Assignee: Lucent Technologies Inc., Murray Hill, NJ (US)

( * ) Notice: Subject to any disclaimer, the term of this patent is extended or adjusted under 35 U.S.C. 154(b) by 896 days.

(21) Appl. No.: 10/458,565

(22) Filed: Jun. 10, 2003

(65) Prior Publication Data

US 2004/0252664 A1    Dec. 16, 2004

(51) Int. Cl.
*H04B 7/216* (2006.01)
(52) U.S. Cl. .................. 370/335; 370/342
(58) Field of Classification Search .......... 370/335, 370/342, 331, 466, 467; 455/442
See application file for complete search history.

(56) References Cited

U.S. PATENT DOCUMENTS 6,771,659 B1 *   8/2004   Parantainen et al. ........ 370/466
2002/0075838 A1 *   6/2002   Choi et al. .................. 370/342

* cited by examiner

*Primary Examiner*—Lee Nguyen

(57) ABSTRACT

A method is provided of transmission of a data frame from a first station to a second station, in a code division multiple access (CDMA) telecommunications network. The network operates according to a hierarchical series of protocol processes including a physical layer process under the control of a radio link control (RLC) process. An indication of when a data frame is passed to the physical layer process for transmission to the second station is sent to the RLC process in the first station. Upon receipt of the indication the RLC process, a timer is started to time a predetermined period before again passing the data frame to the physical layer process for retransmission to the second station unless an acknowledgement of receipt from the second station is received.

18 Claims, 6 Drawing Sheets

IuR DATA FRAME
(MAC-D TO MAC-C)

CONTROL FRAME
(MAC-C TO MAC-D)

METHOD OF TRANSMISSION OF A DATA FRAME FROM A FIRST STATION TO A SECOND STATION, AND A CDMA TELECOMMUNICATIONS NETWORK

FIELD OF THE INVENTION

The present invention relates to a method of transmission of a data frame from a first station to a second station, in a code division multiple access (CDMA) telecommunications network. The present invention also relates to a code division multiple access (CDMA) telecommunications network.

DESCRIPTION OF THE RELATED ART

Known code division multiple access (CDMA) networks, such as Universal Mobile Telecommunications System (UMTS) networks, have problems in the control of data flow between processes in their protocol stacks. In particular, there is considerable unnecessary repeat-forwarding of data from one protocol stack layer to another. Furthermore, switching between channels, as occurs when a mobile hands-over from one cell to another, leads to data being lost. This is also a problem.

SUMMARY OF THE INVENTION

An example of the present invention is a method of transmission of a data frame from a first station to a second station, in a code division multiple access (CDMA) telecommunications network. The network operates according to a hierarchical series of protocol processes including a physical layer process under the control of a radio link control (RLC) process. An indication of when a data frame is passed to the physical layer process for transmission to the second station is sent to the RLC process in the first station. Upon receipt of the indication the RLC process, a timer is started to time a predetermined period before again passing the data frame to the physical layer process for retransmission to the second station unless an acknowledgement of receipt from the second station is received.

Another example of the present invention is a corresponding code division multiple access (CDMA) telecommunications network.

Preferred embodiments have the advantage that premature retransmissions are avoided. One consequence is that RLC retransmission timers can be set to lower values than in known solutions enabling more efficient performance.

The physical process layer is preferably fed data frames by a medium access control (MAC) process for controlling a common channel (hence denoted a MAC-Common or MAC-C process). The MAC-C process is fed data frames by at least two medium access control (MAC) processes each dedicated to a corresponding second station (and hence denoted MAC-Dedicated or MAC-D processes). The indication is passed from the MAC-C process to the MAC-D process for the second station in the first station. In preferred embodiments, the amount of data stored in the MAC-C process for transmission can be increased, hence reducing the amount of flow control messaging required.

In preferred embodiments, upon switching communications with the second station away from via the MAC-C process to via another MAC process, steps are taken to avoid loss of data. For example, any data frames for which an indication of passage to the physical process layer has not been received by the RLC layer can be considered not passed to the physical layer and so be sent from the RLC layer via said another MAC process. Another option is that a list of data frames for the second station which have reached the MAC-C process but have not been passed to the physical process layer can be sent to the RLC process so as to enable data frames on the list to be sent from the RLC layer via said another MAC process. Still furthermore, data frames for the second station which have reached the MAC-C process but have not been passed to the physical process layer can be forwarded to said another MAC process. In consequence of these steps, fewer frames will be lost, resulting in an improved data throughput rate.

BRIEF DESCRIPTION OF THE DRAWINGS

A preferred embodiment of the present invention will now be described by way of example and with reference to the drawings, in which.

DETAILED DESCRIPTION

Figure 1:
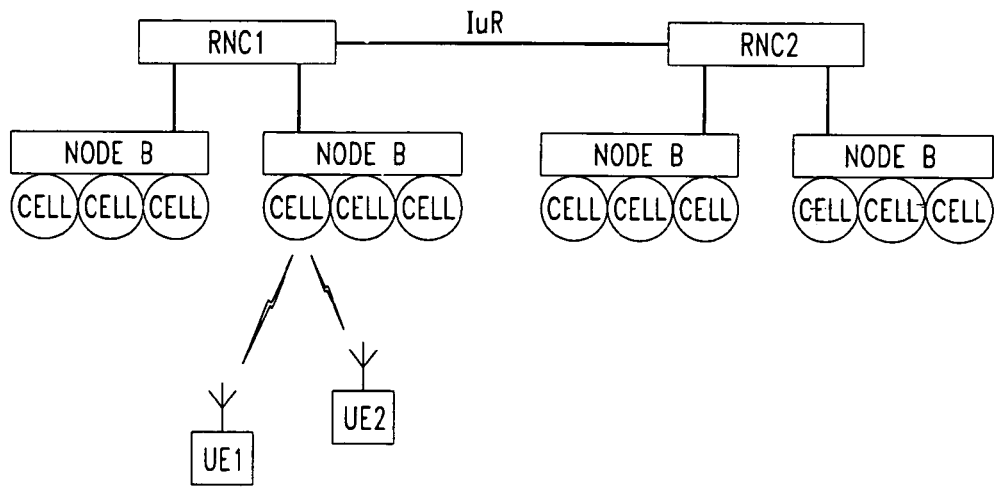
FIG. 1 is a diagram illustrating a UMTS network (PRIOR ART)

As shown in FIG. 1, a known Universal Mobile Telecommunications System (UMTS) network includes serving radio network controllers (RNCs) which control base stations and are also connected to, say a mobile switching centre (MSC) or serving GPRS support node (SGSN,where GPRS denotes General Packet Radio Service) of a so-called core network, i.e. the rest of the telecommunications "world", (not shown). RNCs are interconnected via interfaces known as IuR interfaces. A mobile user terminal, often denoted a User Equipment (UE) in UMTS terminology, is connected by radio to a base station (Node B in UMTS terminology) having several cells of radio coverage. The reader is referred to Third Generation Partnership Project (3GPP) Technical Specification TS 25.401 for background on UMTS networks.

In the known UMTS network, when communications between a mobile user terminal and the base station are via a common, i.e. shared channel, the mobile user terminal communicates only with a single cell of a single base station at any one time. In other words, there is no soft handover (also known as soft handoff) whereby a mobile user terminal communicates with more than one cell at a time, for example to maintain communications whilst on the move.

In the known UMTS network, consider the known situation where a mobile user terminal moves into a cell of a base station which is under the control of another radio network controller (RNC) For example, this is where a first mobile user terminal (denoted UE1) moves to a cell under the control of a first RNC (RNC1) from a cell under the control of a second RNC (RNC2). Here two mobile user terminals UE1, UE2 are both connected to a cell that is under the control of RNC1, although actually it is RNC2 which controls communications with UE2, and RNC1 which controls communications with UE1. The functional responsibility for packet data handling on a shared channel for UE2 is then divided between both the first RNC and second RNC (i.e. RNC1, RNC2) as shown in FIG. 2.

Figure 2:
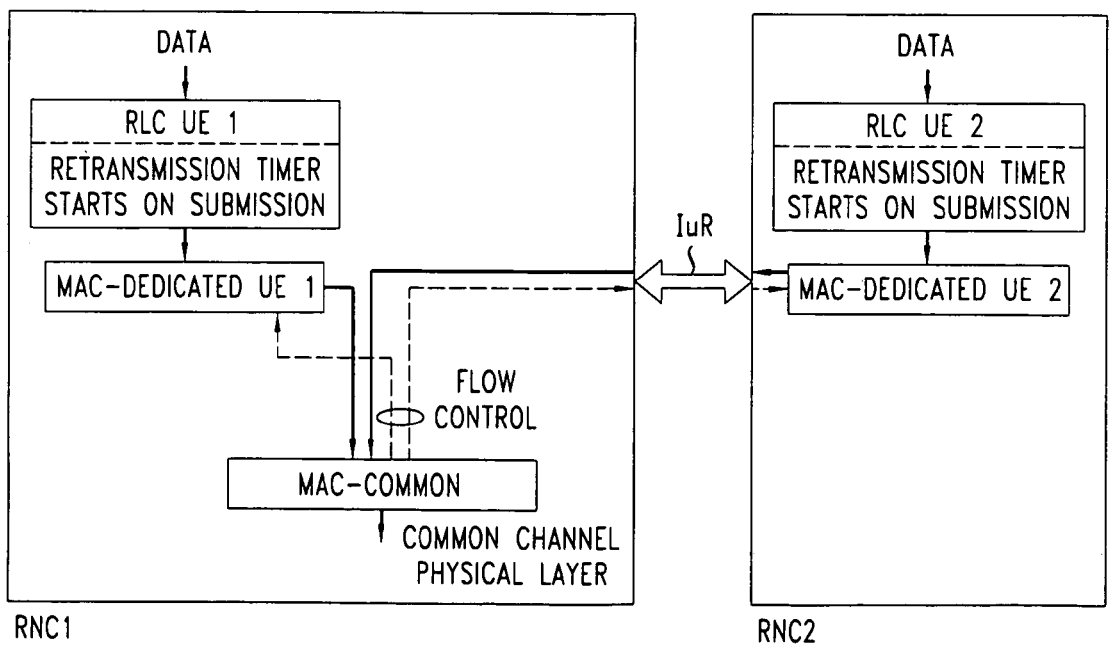
FIG. 2 is a diagram illustrating protocol processes between RNCs (PRIOR ART)

As shown in FIG. 2, the radio network controller (RNC) which is currently responsible for communications with a mobile user terminal (RNC1 for UE1, RNC2 for UE2,) is responsible for radio link control (RLC) so as to ensure reliable transmission of data. The same RNCs (RNC1 for UE1, RNC2 for UE2) are responsible for Medium Access Control (MAC) processes each dedicated to communications with one mobile user terminal (hence denoted "MAC-Dedicated" or "MAC-D") processes which (among other things) take data from the RLC process and forwarding that data to a medium access control (MAC) process for communications over a Common Channel shared between mobile user terminals (hence denoted a "MAC-Common" or "MAC-C") process. There is one MAC-D process for each mobile user terminal communicating i.e. connected. The RNC controlling the cell to which a mobile user terminal is connected is responsible for performing MAC-C processes. In the example, this is RNC1 for both UE1 and UE2. MAC-C protocol takes data which is received from each MAC-D protocol (there are generally many of them, one for each user) and scheduling when the respective data should be transmitted on the shared physical channel. The physical channel is, of course, bandwidth constrained. In order to keep the amount of data stored for transmission down to a manageable size, the MAC-C protocol is responsible for sending flow control information to each MAC-D protocol to occasionally halt the flow of data.

This known approach has a number of disadvantages. As data is passed from several RLC processes (one for each mobile user terminal) to one MAC-C process for scheduling, it is possible that at certain times moderate to long delays in transmission occur dependent upon the amount of data awaiting transmission (on the physical channel). This causes two significant problems.

The first problem is that a retransmission timer in a RLC process is started as soon as the data is passed to a MAC-D process. It is therefore possible that data is buffered for so long in a MAC-C protocol waiting for transmission scheduling, that the RLC process may resend the data to the MAC-D process which then resends the data onto the MAC-C protocol even before the data has being transmitted by being sent out from the MAC-C process to the physical channel. This problem is exacerbated by the fact that the resending may introduce additional traffic on the shared channel and so result in even more unnecessary resends.

The second problem of this known approach is that data buffered in the MAC-C process for transmission may be lost when the mobile user terminal is switched from the common channel either to a dedicated Channel or to a shared channel of another cell.

The known solution to these problems of radio link control (RLC) timeouts and data loss during channel switching is to control the incoming data flow using feedback as to the rate of data flow exiting so as to keep the amount of buffered data in MAC-C process to a reasonably low value. This is so as to reduce the consequential delay. This known solution has shortcomings. There will still be some additional delay and so the retransmission timers are adapted so as to time longer periods in order to cater for the additional delay. Also, often some data will be lost when the mobile user terminal (UE) is transferred from communicating via the MAC-C process of the cell to another cell or to a dedicated channel instead. Furthermore, in order to tightly manage the flow control, additional traffic, namely flow control frames, will be generated over the IuR link connecting radio network controllers (RNCs), thereby reducing efficiency.

Figure 3:
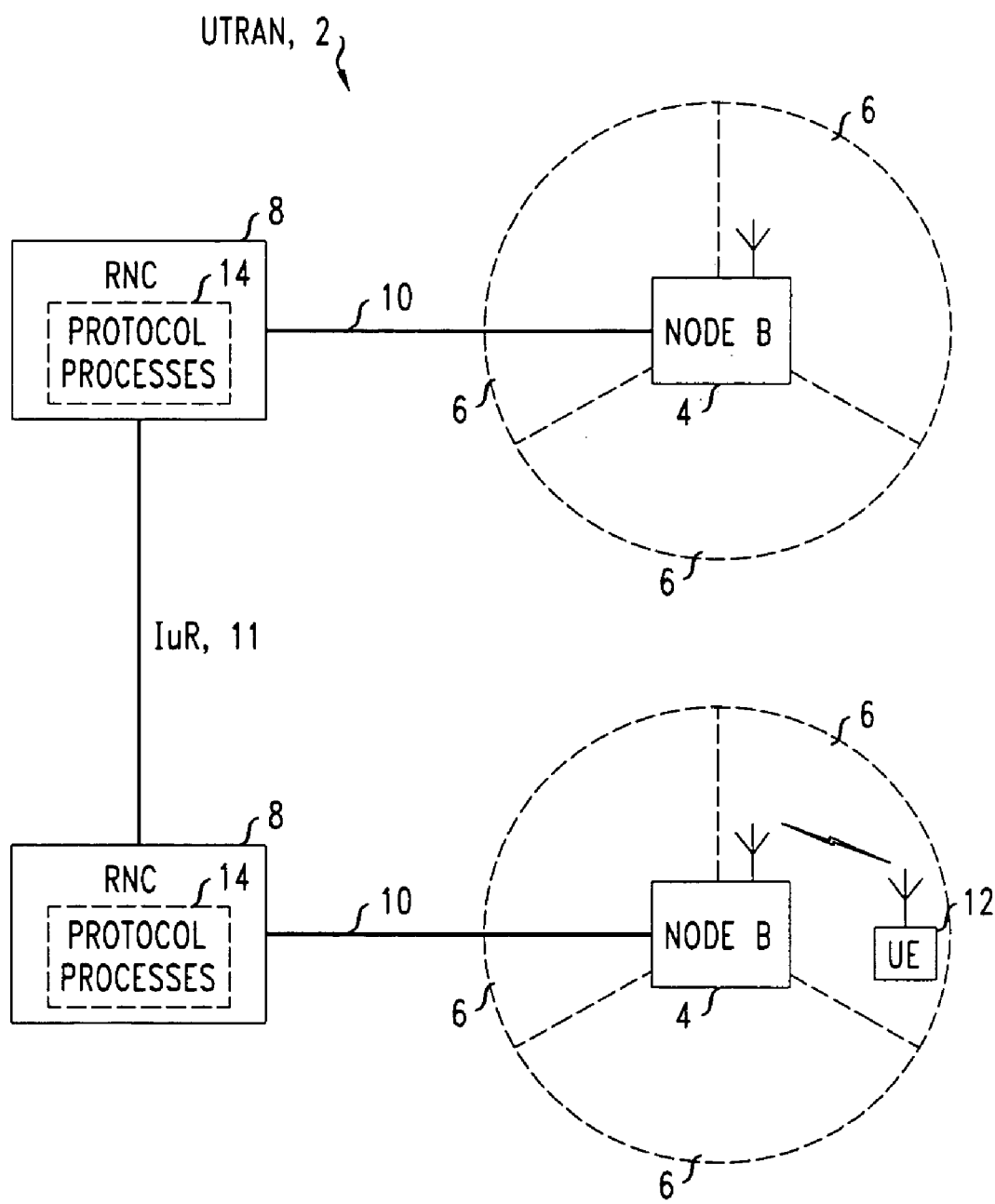
FIG. 3 is a diagram illustrating a preferred UMTS network.

Turning now to preferred embodiments of the present invention, the preferred network is a Universal Mobile Telecommunications System (UMTS) terrestrial access network (UTRAN), which is a type of wideband code division multiple access (CDMA) network for mobile telecommunications. The UTRAN network is basically as shown in FIG. 3. Only two radio network controllers and two base stations of the UTRAN network 2 are shown for simplicity, although there are actually a good many radio network controllers each controlling multiple base stations. As shown in this FIG. 3, the UTRAN network 2 includes base stations 4. Each base station (Node B in UMTS terminology) 4 typically has three cells 6 (i.e. radio coverage areas, also known as sectors) as the base station 4 typically has three directional antennas (not shown) angled at 120 degrees to each other in azimuth. Radio network controllers (RNC) 8 which are themselves connected to the rest of the telecommunications "world" (not shown) each control several base stations 4 and hence a number of cells 6. A base station 4 is connected to its controlling radio network controller (RNC) 8 via a respective interface 10 known as an IuB interface. Each RNC is connected to nearby RNCs via respective IuR interfaces 11. In use, a mobile user terminal 12 (often referred to as User Equipment (UE) in UMTS terminology) communicates with a serving radio network controller (RNC) 8 via at least one cell 6 of at least one base station 4 (i.e. communicates with the UTRAN network 2).

Figure 4:
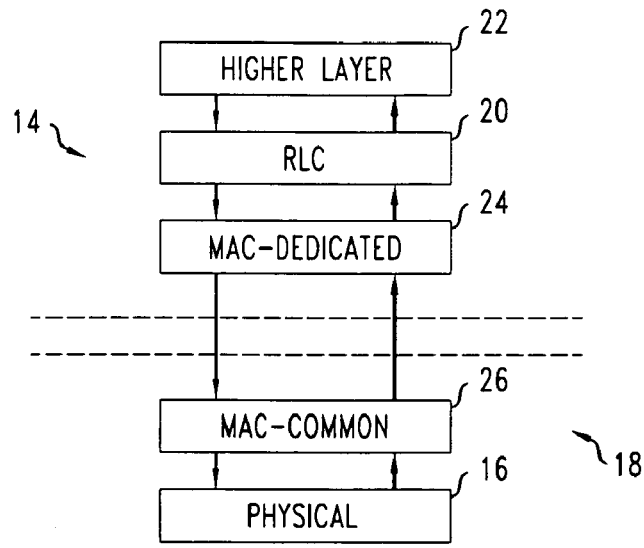
FIG. 4 is a diagram illustrating protocol processes in the preferred network shown in FIG. 3 for communications using a shared channel.

As shown in FIG. 4, communications between the mobile user terminal 12 and RNC 8 are undertaken using a series 14 of processes structured as hierarchically layered protocols (often referred to as a protocol stack). The physical layer 16 communicates with the Medium Access Control (MAC) layer 18. The physical layer 16 offers various transport channels to the MAC layer 18. Different types of transport channels are defined by how and with what characteristics data is transferred on the physical layer 16. The MAC layer 18 offers various logical channels to the radio link control (RLC) layer 20, where a logical channel is an information stream dedicated to a specific type of information characterising the logical channel. The RLC layer 20 communicates with and is under the control of a higher layer 22. The RLC layer 20 can provide an Acknowledged Mode (AM) data transfer service, i.e. a service involving retransmitting data packets until an acknowledgement of receipt is received.

When shared physical channels are used, the medium access control (MAC) layer is divided into two parts, namely a MAC-D (MAC-D) layer 26 and a MAC-Common (MAC-C) layer 24. There is one MAC-C process for each cell. The MAC-C process communicates with many MAC-D processes, as there is one MAC-D process for each user. The MAC-C process schedules the times for sending data from the MAC-D processes on to the physical layer 16. The MAC-C process is also responsible for regulating the flow of data from the MAC-D processes using flow control feedback information.

For some users, the MAC-D process for a user is located in the controlling radio network controller. As the MAC-C process is also within the RNC communications between them are internal to the RNC. For other users, the MAC-D process is located in another RNC communicating with the MAC-C process in the controlling RNC via the IuR Interface. As an example, consider where two mobile user terminals UE1, UE2 are both connected to a cell that is under the control of RNC1, although actually it is RNC2 which controls communications with UE2 and RNC1 which controls communications with UE1. In this scenario, for a shared channel, the relationships between the processes are as shown in FIG. 5 and described as follows.

Figure 5:
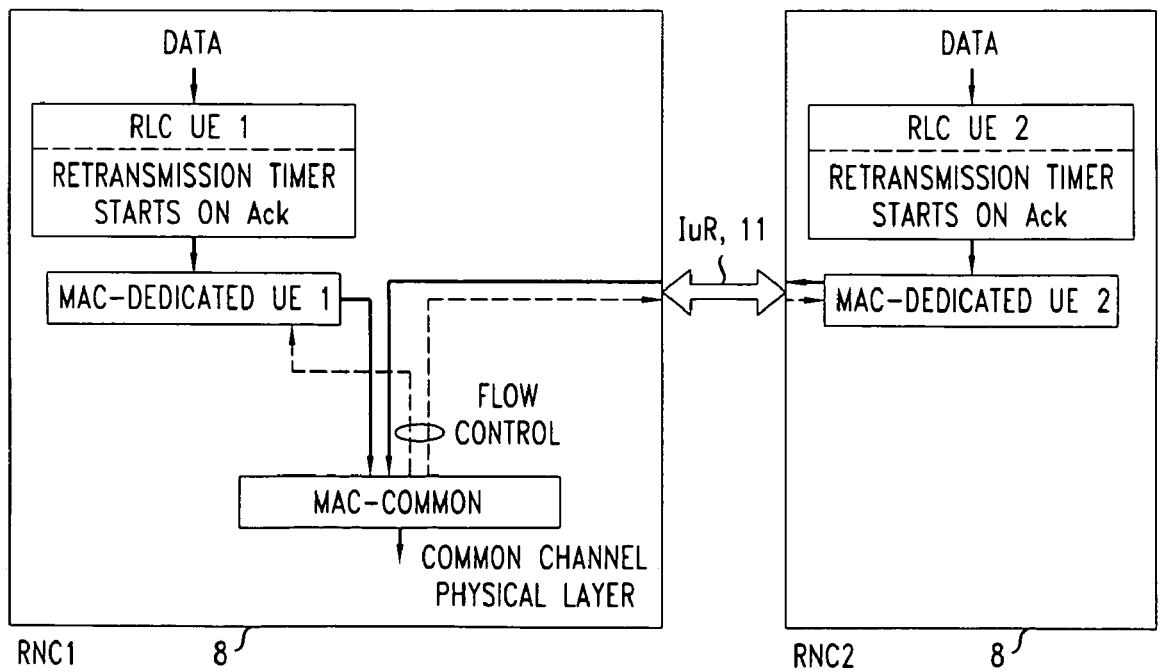
FIG. 5 is a diagram illustrating the relationships between the protocol processes in more detail.

As shown in FIG. 5, the radio network controller (RNC) that is currently responsible for communications with a mobile user terminal (RNC1 for UE1, RNC2 for UE2,) is responsible for radio link control (RLC) which ensures reliable transmission of data. The same RNCs (RNC1 for UE1, RNC2 for UE2) are responsible for MAC-D processes which (among other things) take data from RLC layer 20 and forwarding that data to a MAC-C process. The RNC controlling the cell to which a mobile user terminal is connected is responsible for performing a MAC-C protocol process. In this example, this is RNC1 for both UE1 and UE2. As mentioned previously, a MAC-C process takes data which is received from each MAC-D process and schedules when the data should be transmitted on the shared physical channel. The physical channel is, of course, bandwidth constrained. In order to keep the amount of data stored for transmission down to a manageable size, as shown in FIG. 4, the MAC-C process sends flow control information to each MAC-D process to selectively halt the flow of data therefrom.

Radio link Control (RLC) Timer Setting

Figure 6:
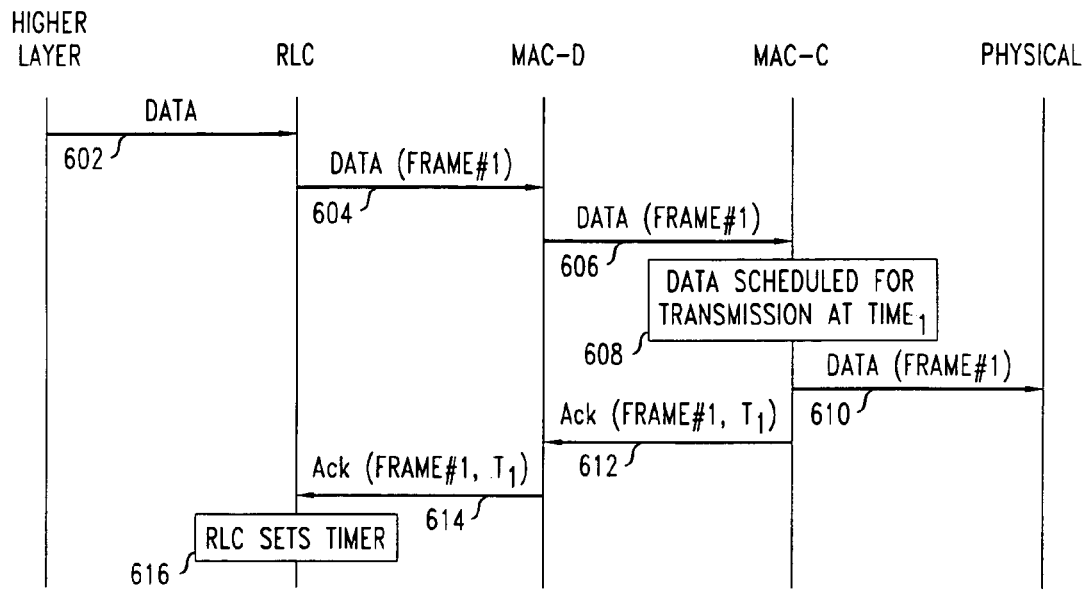
FIGS. 6 to 10 are diagrams illustrating an examples of communication flows between the processes.

Referring to FIG. 6, data is sent (step 602) from the higher layer process to the RLC process for that mobile user terminal. It is sent frame by frame to the MAC-D process for that mobile user terminal (step 604). Each frame of data is then transferred (step 606) to the MAC-C process where it is scheduled for transmission at a specific time (step 608). At the appropriate time the data is transmitted by being transferred (step 610) to the physical layer process.

A notification message, e.g. ACKnowledgement (frame #2, transmission time T1) is sent (step 612) from the MAC-C process to the MAC-D process to indicate, which frame was transmitted to the physical layer and when transmission was achieved onto the physical layer. In the case of a mobile user terminal with the cell to which it is connected and hence its associated MAC-D process in the same radio network controller (RNC) as the MAC-C process (e.g. processes for UE1 in FIG. 4), this notification message is internal. In the case where the cell to which the mobile is connected is under the control of another RNC, the notification message is sent over the IuR (e.g. to RNC2 as shown in FIG. 4).

A notification message is then sent (FIG. 6, step 614) going from the MAC-D process to the RLC process notifying the RLC process of which frame has been transmitted and when transmission occurred onto the Physical layer. This message is always internal to the RNC controlling communications with the mobile user terminal in question.

The RLC process then sets its retransmission timer based upon the information received from the MAC-D process (step 616). For example, if the RLC process has a retransmission timer of 500 ms, and the notification of submission to the physical layer indicated a transmission time T1 which was 200 ms ago, the timer will be set to time a period of 300 ms and is started. This has the advantage that retransmission from the RLC process cannot occur before the data originally transmitted from the RLC process has even been transmitted to the Physical layer.

The notification (ACK(frame number, time)) from the MAC-C process to the appropriate MAC-D process (and hence the appropriate RLC process) includes an indication of which MAC-D frame has been submitted and the time at which the frame was submitted to the Physical layer. In both cases, the size of the indications may be kept to a minimum. For example, the identifier of the MAC-D frame need only be a number from 1 to the Maximum number of frames buffered in the MAC-C process for example three, six or 15. The time of passage to the Physical Layer need only be to a coarse resolution e.g. multiples of 10 ms from 0 to the maximum delay (e.g. 2 seconds) which is expected between the time of arrival of a frame at the MAC-C process and the time of passage of the frame to the Physical layer.

Data Retransmission

Figure 7:
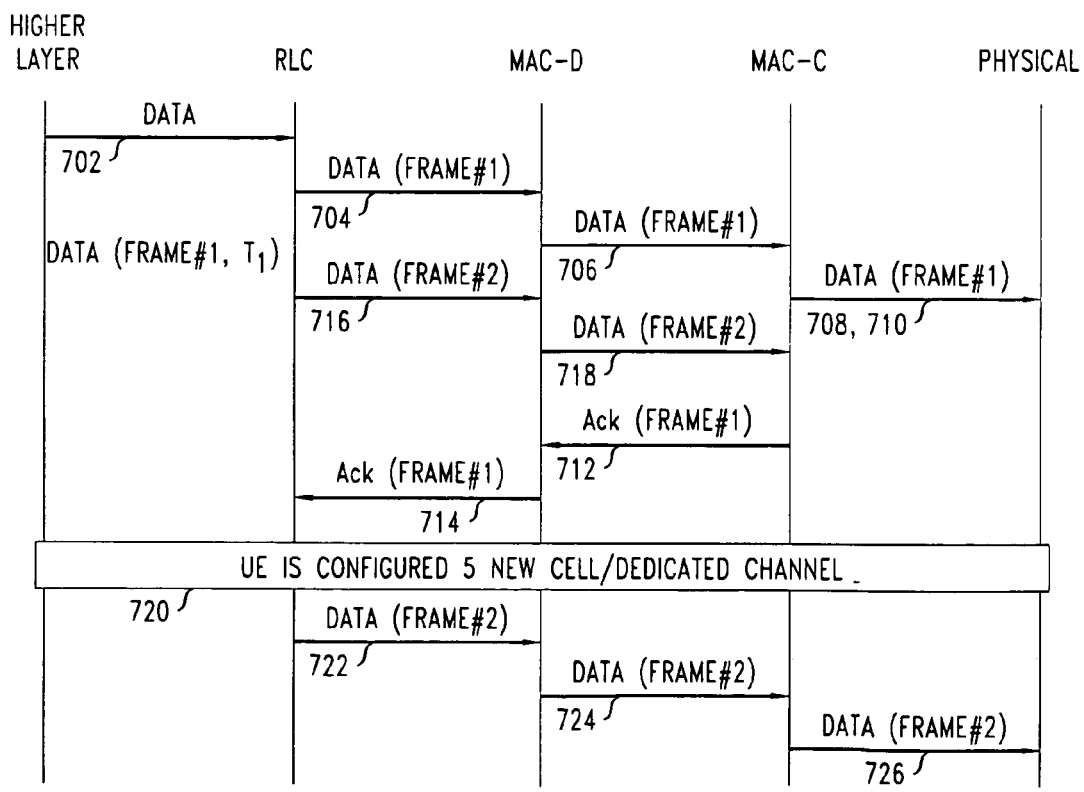

Turning now to FIG. 7, data is sent (step 702) from the higher layer process to the radio link control (RLC) process for that mobile user terminal. Each frame of data is sent to the MAC-D process for that mobile user terminal (step 704). The frame of data is then transferred (step 706) to the MAC-C process where it is scheduled for transmission at a specific time (step 708). At the appropriate time, the data is transmitted by being transferred (step 710) to the physical layer process.

A notification message, e.g. ACKnowledgement (frame #1) is sent (step 712) from the MAC-C process to the MAC-D process to indicate which frame was transmitted to the physical layer. A notification message is then sent (step 714) going from the MAC-D process to the RLC process.

Data is sent frame by frame. For example, a second data frame is sent from the RLC process for a mobile user terminal to the MAC-D process (step 716) and then on to the MAC-C process (step 718).

When switching (step 720) communications with a mobile user terminal from the MAC-Common channel for a cell to either a MAC-D channel or a MAC common channel of another cell, it is assumed that any data which has not been acknowledged as being submitted to the physical layer needs retransmission. Accordingly, in this example, the second data frame is resent (step 722) from the RLC process to the MAC-D process, onto the further MAC-C process (step 724) then onto the Physical Layer (step 726).

In an alternative method not shown, the messaging is as shown in FIG. 7 save that the acknowledgements include not only a frame number indication but the time of transmission to the Physical layer as shown in FIG. 6. The radio link control (RLC timer) is reset as per the example shown in FIG. 6, and described in the previous section.

Avoiding Losing Data

Figure 8:
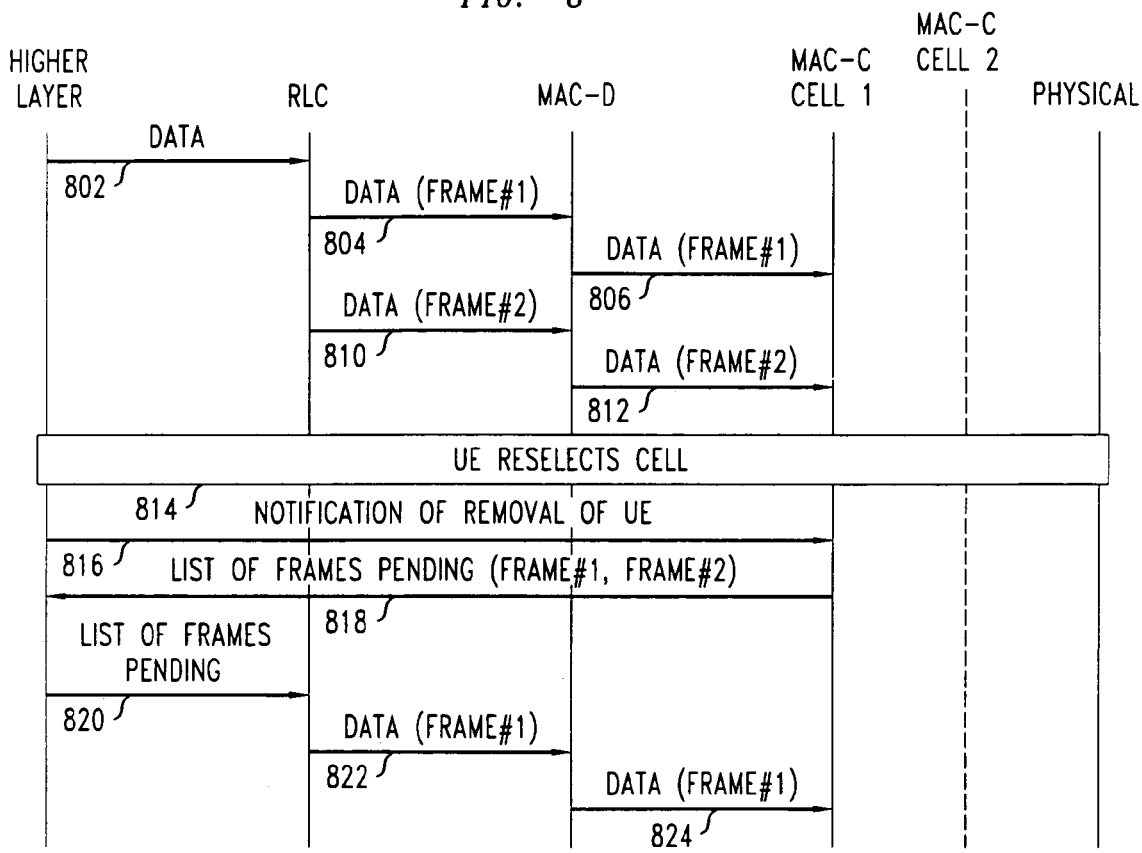

As shown in FIG. 8, data is sent (step 802) from the higher layer process to the RLC process for that mobile user terminal. Each frame of data is sent to the MAC-D process for that mobile user terminal (step 804). The frame of data is then transferred (step 806) to the MAC-C process where it is scheduled for transmission at a specific time. At the appropriate time, the data is transmitted (not shown) by being transferred to the physical layer process.

Data is sent frame by frame. For example, a second data frame is sent from the RLC process for a mobile user terminal to the MAC-D process (step 810) and then on to the MAC-C process (step 812).

When the mobile user terminal transfers (step 814) from being connected with a first cell (Cell 1) to being connected with a second cell (Cell 2), a notification is sent (step 816)

from the Higher layer process to the MAC-C process of Cell 1 indicating that it should reconfigure so as to no longer communicate with the MAC-D process for that mobile user terminal. As part of its reconfiguration, the MAC-C process for the first cell forwards (step 818) to the Higher Layer process via the RLC process and the MAC-D process for that mobile user terminal, a list of all frames which have not yet been submitted to the Physical layer. The Higher Layer then forwards (step 820) this list of data frame(s) to the RLC process. The frames are then forwarded (step 822) one by one to the MAC-D process. These frames are then passed (step 824) to the MAC-C process for the new cell (i.e. a MAC common channel of another cell) if to be sent over a shared channel. Alternatively, the frames are from then on sent direct from the MAC-D process to the Physical Layer where a dedicated physical channel is to be used for that user rather than a shared channel as previously.

Figure 9:
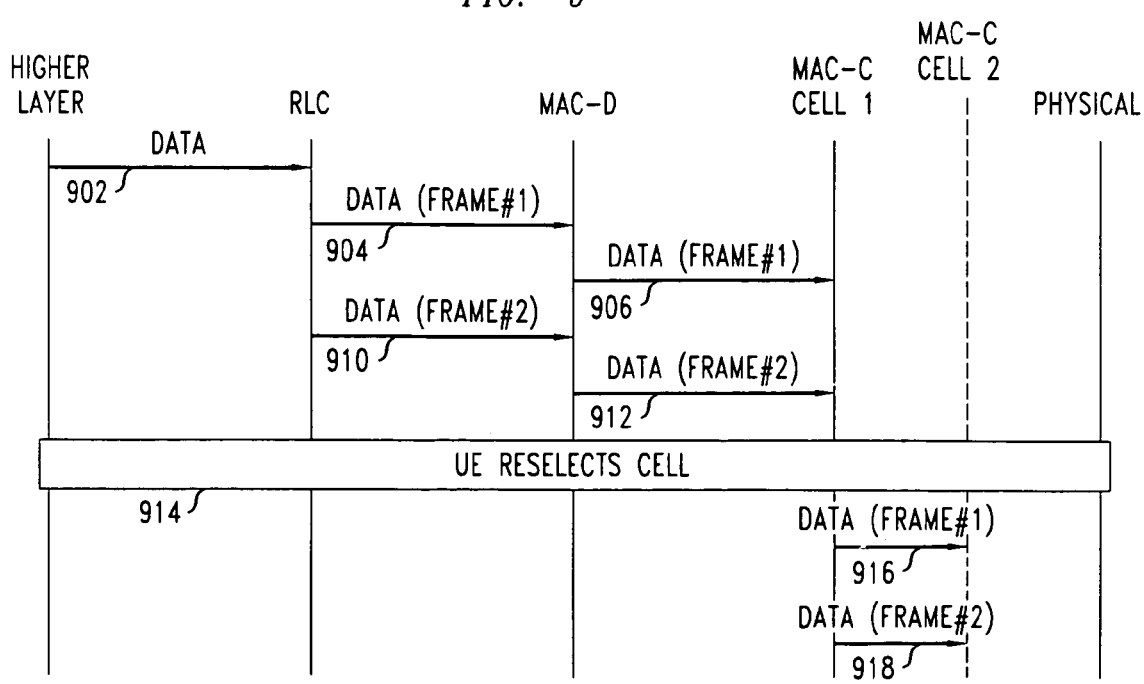

An alternative is shown in FIG. 9, the steps taken are as described in respect of FIG. 8, up to and including the step of the mobile user terminal transferring (step 914) from being connected with a first cell (Cell 1) to being connected with a second cell (Cell 2). Just to recap, data is sent (step 902) from the higher layer process to the radio link control (RLC) process for that mobile user terminal. Each frame of data is sent to the MAC-D process for that mobile user terminal (step 904). The frame of data is then transferred (step 906) to the MAC-C process where it is scheduled for transmission at a specific time. At the appropriate time, the data is transmitted (not shown) by being transferred to the physical layer process. Data is sent frame by frame. For example, a second data frame is sent (step 910) from the RLC process for a mobile user terminal to the MAC-D process and then sent on (step 912) to the MAC-C process. The mobile user terminal then transfers (step 914) from being connected with a first cell (Cell 1) to being connected with a second cell (Cell 2).

From here on what happens as shown in FIG. 9 is different to the example shown in FIG. 8. Specifically, in the FIG. 9 example if the second cell (Cell2) is under the control of the same radio network controller (RNC) as the first cell, frames not yet passed to the physical layer (i.e. transmitted) are sent (steps 916,918) to the MAC-C process of the new (i.e. second) cell for passage to the Physical Layer.

Improving Efficiency

Figure 10:
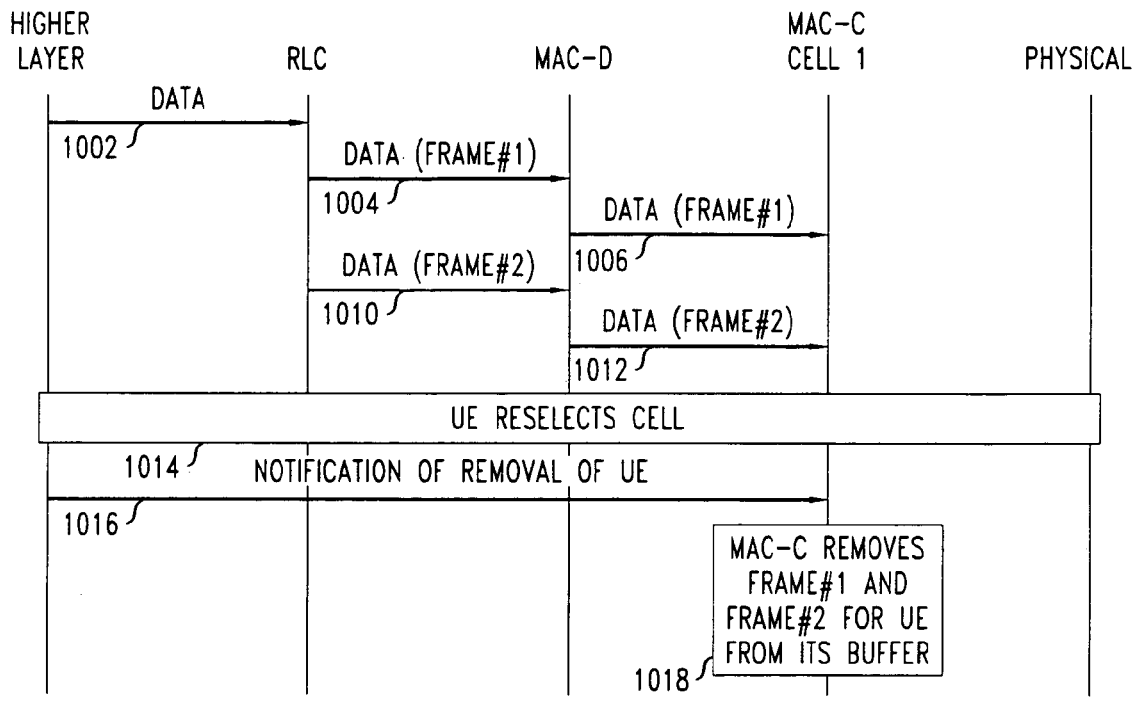

In another option is shown in FIG. 10, the steps taken are as described in respect of FIG. 8, up to and including the step of a notification being sent (step 1016) from the Higher layer process to the MAC-C process of Cell 1 indicating that it should reconfigure. Just to recap, data is sent (step 1002) from the higher layer process to the RLC process for that mobile user terminal. Each frame of data is sent to the MAC-D process for that mobile user terminal (step 1004). The frame of data is then transferred (step 1006) to the MAC-C process where it is scheduled for transmission at a specific time. At the appropriate time, the data is transmitted (not shown) by being transferred to the physical layer process. Data is sent frame by frame. For example, a second data frame is sent (step 1010) from the RLC process for a mobile user terminal to the MAC-D process and then sent on (step 1012) to the MAC-C process. The mobile user terminal then transfers (step 1014) from being connected with a first cell (Cell 1) to being connected with a second cell (Cell 2). When the mobile user terminal transfers (step 1014) from being connected with a first cell (Cell 1) to being connected with a second cell (Cell 2), a notification is sent (step 1016) from the Higher layer process to the MAC-C process of Cell 1 indicating that it should reconfigure so as to no longer communicate with the MAC-D process for that mobile user terminal.

From here on what happens as shown in FIG. 10 is different to the example shown in FIGS. 8. When the MAC-C process of the first cell is being reconfigured to remove the mobile user terminal, any data frames for that mobile user terminal are purged (step 1018) from the MAC-C process of the first cell in order to avoid unnecessary transmission of those frames on the Physical layer so as to improve radio efficiency.

Data Frame Structure

Where the MAC-D process for a mobile user terminal and the MAC-C process are within the same radio network controller (RNC), data frames each including a header and payload are simply sent between the two processes.

Figure 11:
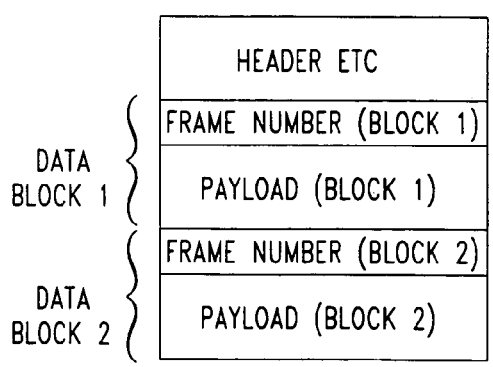
FIG. 11 is a diagram illustrating a data frame used on the IuR interface for communications between MAC-D and MAC-C processes.

In the cases where a MAC-D process for a mobile user terminal is connected to a MAC-C process in another RNC (i.e. over the IuR interface), the frame number is included in the data frames sent for transmission. An example data frame for this purposes is shown in FIG. 11. Inclusion of the frame number enables notification from the MAC-C process in one RNC to the MAC-D process in another RNC of which frame is submitted to the Physical layer, and, in some embodiments, when that data frame is submitted to the physical layer.

Control Frame (i.e. Control Message) Structure

In all cases, it is possible that, the notifications of passage to the Physical layer, i.e. the feedback of frame number (and possibly time of passage to the Physical layer) from MAC-C process to the appropriate MAC-D process are appended to the flow control framing protocol messages, shown as dashed lines back in FIG. 5, between the MAC-C process and the appropriate MAC-D process for that mobile user terminal.

Figure 12:
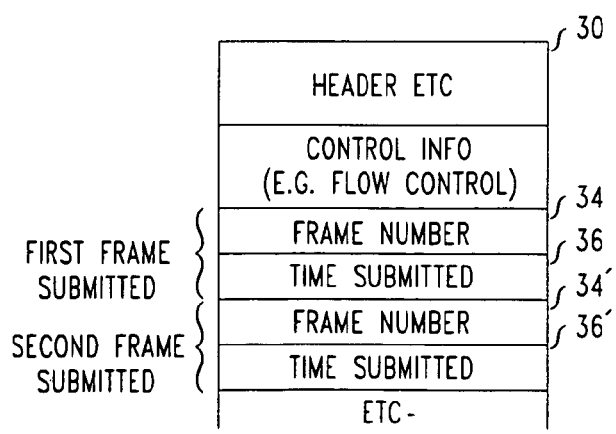
FIG. 12 is a diagram illustrating a control frame used on the IuR interface for communications between MAC-D and MAC-C processes.

A control message 28 including such a notification and flow control information is shown in FIG. 12. Such a control message 28 is sent from the MAC-C process to the MAC-D process either within an RNC or over the IuR interface. The control message 28 includes a header 30, flow control information 32, and notifications comprising identifiers of frames (frame numbers) 34,34' and times 36,36' of submission of the respective frame to the physical layer.

The invention claimed is:

1. A method of transmission of a data frame from a first station to a second station, in a code division multiple access (CDMA) telecommunications network operating according to a hierarchical series of protocol processes including a physical layer process under the control of a radio link control (RLC) process, the method comprising the steps of:

sending to the RLC process in the first station an indication of when a data frame is passed to the physical layer process for transmission to the second station, upon receipt of the indication the RLC process starting a timer to time a predetermined period before again passing the data frame to the physical layer process for retransmission to the second station unless an acknowledgement of receipt from the second station is received, feeding the physical process layer data frames by a medium access control process for controlling a common channel (MAC-C), and feeding the MAC-C process data frames by at least two medium access control processes (MAC-D) each dedicated to a corresponding second station, the indication being passed from the MAC-C process to the MAC-D process for the second station in the first station, in which upon switching communications with the second station away from via the MAC-C process to via another MAC process, any data frames for which an indication of passage to the physical layer process has not been received by the RLC layer is considered not so passed to the physical layer and so is sent from the RLC layer via said another MAC process.

2. A method according to claim 1, in which the first station comprises a radio network controller (RNC) in which the MAC-C process, and a base station under the control of the RNC, the base station comprising at least one cell, and each second station is a mobile user terminal in radio communication with the base station via the cell.

3. A method according to claim 2 in which at least one MAC-D process operates in said RNC, and at least one MAC-D process operates in another RNC connected to the MAC-C process in said RNC via an IuR interface.

4. A method according to claim 3, in which data frames sent for transmission from the MAC-D process in said other RNC to the MAC-C process in said RNC include an indication of frame number for the purpose of identification.

5. A method according to claim 1, in which the indication of passing the data to the physical layer process comprises data of a frame number and time of passage of the frame to the physical layer process.

6. A method according to claim 5, in which the data is sent as part of a control frame from the MAC-C process to the MAC-D process for the second station, the control frame including a header, flow control data, and at least set of one frame number and associated time of passage to the physical process layer.

7. A method according to claim 1, in which upon switching communications with the second station away from via the MAC-C process to via another MAC process, a list of data frames for the second station which have reached the MAC-C process but have not been passed to the physical layer process is sent to the RLC process so as to enable data frames on the list to be sent from the RLC layer via said another MAC process.

8. A method according to claim 1, in which upon switching communications with the second station away from via the MAC-C process to via another MAC process, data frames for the second station which have reached the MAC-C process but have not been passed to the physical layer process are forwarded to said another MAC process.

9. A method according to claim 1, in which upon switching communications with the second station away from via the MAC-C process to via another MAC process, data frames for the second station in the MAC-C process but not yet passed to the physical layer are deleted from the MAC-C buffer.

10. A code division multiple access (CDMA) telecommunications network operative according to a hierarchical series of protocol processes including a physical layer process under the control of a radio link control (RLC) process, the network comprising a first station and a second station, the first station configured to send to an RLC process an indication of when a data frame is passed to a physical layer process for transmission to the second station, upon receipt of the indication the RLC process of the first station configured to start a timer to time a predetermined period before again passing the data frame to the physical layer process for retransmission to the second station unless an acknowledgement of receipt from the second station is received, in which in the first station the physical process layer is fed data frames by a medium access control process for controlling a common channel (MAC-C), and the MAC-C process is fed data frames by at least two medium access control processes (MAC-D) each dedicated to a corresponding second station, the indication being passed from the MAC-C process to the MAC-D process for the second station in the first station, in which upon switching communications with the second station away from via the MAC-C process to via another MAC process, any data frames for which an indication of passage to the physical process layer has not been received by the RLC layer is considered not so passed to the physical layer and so is sent from the RLC layer via said another MAC process.

11. A network according to claim 10, in which the first station comprises a radio network controller (RNC) in which the MAC-C process resides, and a base station under the control of the RNC, the base station comprising at least one cell, and each second station is a mobile user terminal in radio communication with the base station via the cell.

12. A network according to claim 11, in which at least one MAC-D process configured to operate in said RNC, and at least one MAC-D process configured to operate in another RNC connected to the MAC-C process in said RNC via an IuR interface.

13. A network according to claim 12 in which data frames sent for transmission from the MAC-D process in said other RNC to the MAC-C process in said RNC include an indication of frame number for the purpose of identification.

14. A network according to claim 10 in which the indication of passing the data to the physical layer process comprises data of a frame number and time of passage of the frame to the physical layer process.

15. A network according to claim 14, in which the data is sent as part of a control frame from the MAC-C process to the MAC-D process for the second station, the control frame including a header, flow control data, and at least set of one frame number and associated time of passage to the physical process layer.

16. A network according to claim 10 in which, upon switching communications with the second station away from via the MAC-C process to via another MAC process, a list of data frames for the second station which have reached the MAC-C process but have not been passed to the physical layer process is sent to the RLC process so as to enable data frames on the list to be sent from the RLC layer via said another MAC process.

17. A network according to claim 10, in which, upon switching communications with the second station away from via the MAC-C process to via another MAC process, data frames for the second station which have reached the MAC-C process but have not been passed to the physical layer process are forwarded to said another MAC process.

18. A network according to claim 10 in which, upon switching communications with the second station away from via the MAC-C process to via another MAC process, data frames for the second station in the MAC-C process but not yet passed to the physical layer are deleted from the MAC-C buffer.

* * * * *